June 2, 1942.  F. H. MUELLER  2,285,221
VALVE
Filed June 7, 1940
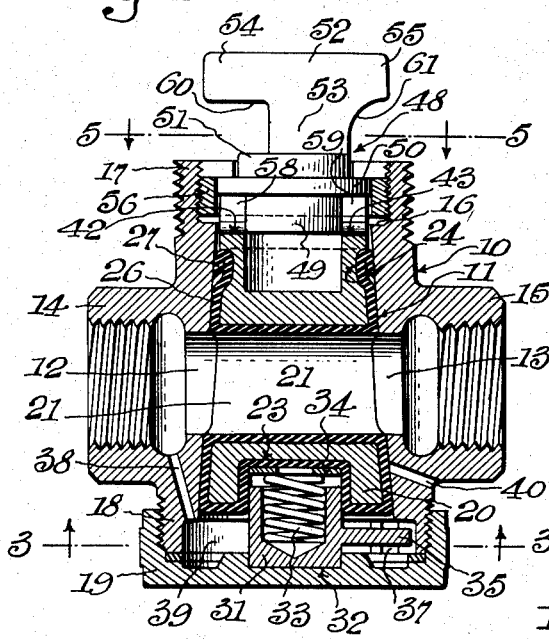
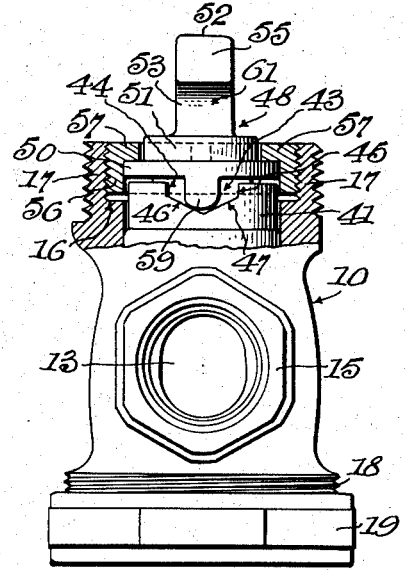
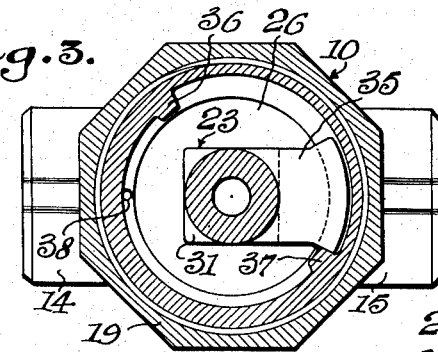
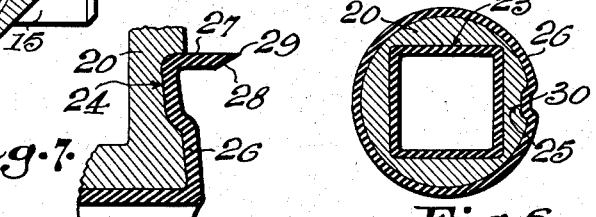
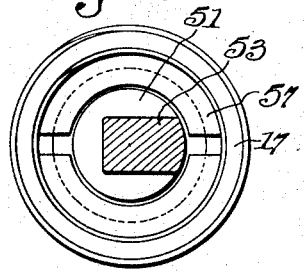
Inventor
Frank H. Mueller
By Cushman, Darby, Cushman
Attorneys Patented June 2, 1942

2,285,221

UNITED STATES PATENT OFFICE 2,285,221

VALVE

Frank H. Mueller, Decatur, Ill., assignor to Mueller Co., Decatur, Ill., a corporation of Illinois Application June 7, 1940, Serial No. 339,367

1 Claim. (Cl. 251—112)

This invention relates to valves and in particular to valves in the nature of curb stops equipped with rotary plugs. An object of the invention is to produce a tight-sealing yet easily operated valve. A further object is to provide a valve wherein the metal plug is rubber-encased in a manner to protect it completely against fluid action in normal use. Other objects are to provide for drainage of fluid beyond the valve when the valve is closed, and to provide for easy assembly of the valve in manufacture. The features whereby these and other objects are obtained may in some cases be employed separately although preferably conjointly as in the embodiment shown by way of example in the accompanying drawing to which reference will now be made.

In the drawing:

Figure 1 is an axial section of a valve according to the invention, the plug being shown in open position;

Figure 2 is an elevation of the valve as seen from the right of Figure 1, the upper portion of the valve being shown in axial section;

Figure 3 is a section substantially on line 3—3 of Figure 1;

Figure 4 is a partial section like that of Figure 1 but showing the valve plug in closed position;

Figure 5 is a section substantially on line 5—5 of Figure 1;

Figure 6 is a section substantially on line 6—6 of Figure 4;

Figure 7 is a partial section of the valve plug prior to insertion in the casing; and Figure 8 is an enlargement of a portion of the valve plug and casing on the section of Figure 1.

Referring to the drawing, reference numeral 10 designates generally a casing in which is formed an upwardly tapered conical seat 11. An inlet port 12 and an outlet port 13, diametrically opposite and co-axial, are in communication with the chamber defined by the seat and outwardly run into coupling portions 14 and 15 of any desired form.

Upwardly the seat 11 terminates at a shoulder 16 beyond which is an internally threaded neck 17. At the lower end of the seat is an externally threaded neck 18 on which is threaded a closure cap 19.

The valve plug comprises a metal core 20 provided with a diametrical flow passage 21 which in the relation shown in Figure 1 connects ports 12 and 13, whereas in Figure 4 the plug, being at 90° from the position in Figure 1, prevents flow. At its large end the core is provided with an axial recess 23 of non-round section, here shown as square, Figure 6. At its small end the core is provided with an annular depression 24 and adjacent its lower end with an axially extending depression 25, Figures 4 and 6.

The core is provided with a sheathing or covering 26 of rubber which is complete up to the top of the depression 24, this covering being molded and vulcanized to the core to provide an integral envelopment. From Figure 1 it will be observed that the sides of the core are covered from the bottom up to the top of the depression 24, the bottom, including the recess 23, is completely covered, and the passage 21 is completely lined, all in the absence of any discontinuity whatever.

As here shown the metal core, up to the depression 24, has the same conicity as the seat 11 and the rubber covering is of uniform thickness so that this conicity is preserved. However, it is to be understood that it is only essential that the outer surfaces of the covering have the proper conicity for mating with the seat 11 and that the core can be differently shaped.

At the upper end of the depression 24 the sheathing is continued in a flexible circumferential flange 27 which in original form projects freely radially as shown in Figure 7, the lower margin being beveled at 28 to provide a thin outer edge 29. When in assembly the plug is pushed into the seat, the flange 27 is folded over to the position shown in Figure 1 so that a cupped relation is assumed with the flange now in the form of a skirt, due to its resiliency bearing against the seat 11. It will be evident that fluid under pressure rising between the plug and seat will force the skirt outwardly against the seat to enhance the seal. The rubber covering follows the depression 24 so that an annular recess is provided for the normal reception of the skirt. Consequently the latter cannot interfere with the proper seating of the plug.

In Figures 4 and 5 it will be seen that the covering 26 sets into the depression 25 so that a longitudinally extending blind groove 30 is provided.

Slidably received in the recess 23 is the square upper end of a block 31, here shown as being in the form of an upwardly open cup. The lower round end of the block 31 is received in a thrust and journal bearing 32 of cap 19. A compression spring 33 received in the cavity of the block 31 bears downwardly against the bottom wall of the latter and upwardly against a washer 34 so that the plug is pressed upwardly against its seat although it may move downwardly a substantial distance toward the block 31 due to the normal spacing of the upper end of the latter below the washer 34. The block has an integral radial arm 35 whose extremity cooperates with stops 36 and 37 on the interior of neck 18 so as to limit the turning movement of the plug to 90°. When stop 37 is engaged the plug is in fully open position whereas when stop 36 is engaged the plug passage is perpendicular to the axis of ports 12 and 13.

The action of the spring 33 need not be especially strong since I rely principally on fluid pressure for securely seating the plug. To this end I provide a duct 38 which leads from the casing inlet to the closed chamber 39 at the base of the plug so that in use the plug is securely seated by fluid pressure in this chamber. In order to drain the fluid on the outlet side of the plug when the plug is closed I provide the casing with a downwardly directed duct 40 with which the lower end of the groove 30 registers when the plug is in off position, the upper end of the groove then communicating with the outlet 13, Figure 4.

The plug core has at its small end a cylindrical collar 41 provided with diametrically opposite recesses or notches 42 and 43 of identical and symmetrical form. Referring particularly to Figure 2, the recess 43 has opposite axially extending wall portions 44 and 45 and downwardly inclined wall portions 46 and 47.

An operator member 48 has a boss portion 49 received in the collar 41 and a circular flange 50 overlying the collar, the flange being surmounted by a circular boss portion 51. A T head 52 extends upwardly from portion 51 and includes a stem portion 53 and a cross portion which includes the end portions 54 and 55. The operator member is held in position by means of a ring 56 threaded in the neck 17 and having an inwardly directed flange 57 embracing boss portion 51 and overlying the margins of the circular flange 50. At diametrically opposite points the operator member has lugs 58 and 59 beneath flange 50 and received respectively in the notches 42 and 43. The lower ends of these lugs are held in adjacency with the inclined bottom walls of the notches by the flange 57 of ring 56 but there is some clearance in order that under all circumstances the plug can seat fully without interference.

If the operator member 48 is turned in a clockwise direction as seen from the top, Figures 1 and 2, the lug 59 will engage the cam surface 46 of recess 43 and the lug 58 will similarly engage a cam surface of recess 42. Consequently the plug will be moved bodily downwardly so as to be loosened in the seat. The natural resiliency of flange 27 and the fluid pressure acting thereon hold the free margin or edge of the skirt tightly against the seat 11 so that leakage upwardly is prevented in all relations of the plug to the seat. When lug 59 engages the wall or stop portion 44 of notch 43 depression of the plug will cease and the plug will be rotated to closed position wherein arm 35 strikes stop 36. The same sequence, i. e., depression and then rotation of the plug, will occur when the operator is turned in the opposite direction to again open the valve.

In use, when the valve is closed, the rubber sheathing, depending on its hardness, may be bulged more or less into the outlet port due to fluid pressure on the inlet side and as a result the plug may be canted somewhat from bottom to top toward the outlet port. Under this condition, when the operator member is turned in a clockwise direction the lug 59 will come into engagement with its associated cam surface 46 before the lug 58 will engage its associated cam surface and as a result a righting action will be imparted to the plug. Lug 58 will then engage its respective cam surface and depression and rotation of the plug will follow.

Due to this mode of operation it will be evident that danger of damage to the rubber sheathing will be avoided to a great extent and that the valve is easily operable although the plug is normally very tightly engaged in its seat. Furthermore all parts of the core which are subject to fluid action are protected against corrosion by the rubber envelope. The uncovered collar portion 41 of the core is protected against fluid action by the sealing action of the flange or skirt 27.

In order to secure proper turning leverage the head of the T 52 should be of substantial length and in proper relationship this length is greater than the diameter of the opening defined by flange 57 of ring 56. Obviously if the ring is to be in one piece it cannot be assembled with the operator member except over the T 52, the flange 50 preventing assembly from the other direction. I therefore recess the stem 53 at 60 beneath the end portion 54 sufficiently so that by engaging one side of the ring in the recess the ring can be swung over the end portion 55 and, by reason of a recess 61 which terminates downwardly flush with the periphery of boss portion 51, into embracing relation with the said boss portion. It will be appreciated that this is a feature of considerable importance in the economical assembly of the parts. It should be mentioned that the lugs 58 and 59 are in the plane of the T head and consequently when the head extends longitudinally of the coupling portions 14 and 15 it is known that the valve is open, closed position of the valve being indicated by the fact that the head extends transversely of the line.

In speaking of a "rubber" sheathing for the plug core I contemplate any suitable rubber or rubber-like composition, natural or artificial. The sheathing may vary as to hardness in accordance with requirements and if necessary the flange 27 may be differentially vulcanized in order that it may be suitably flexible. I, of course, do not limit myself to the exact details of form and arrangement herein disclosed since the invention is susceptible of varied embodiment within the scope of the following claim:

I claim:

A valve comprising a casing providing a conical seat, a rotary conical plug in said casing, said casing including a closure cap spaced from the large end of said plug, an axial recess in the large end of said plug, a block having one end slidably but non-rotatably received in said recess, said cap having a recess providing a journal and thrust bearing in which the other end of said block is received, a compression spring between said plug and block, there being a substantial clearance at the extremity of said block which is in said first named recess when said plug is seated by the action of said spring, a radial arm on said block, stops in said casing with which said arm is cooperable to limit turning movement of said plug, and means for axially displacing said plug against said spring as permitted by said clearance and for then turning the plug.

FRANK H. MUELLER.